INVENTOR.
KURT W.H. LEIBFRITZ
BY John N. Wolfram
ATTORNEY 3,425,449
SOLENOID CONTROLLED VALVE
Kurt Willy Hjlmar Leibfritz, Norridge, Ill., assignor to Parker-Hannifin Corporation, Cleveland, Ohio, a corporation of Ohio
Filed Nov. 10, 1966, Ser. No. 593,365
U.S. Cl. 137—625.64      5 Claims
Int. Cl. F16k 31/12

This invention relates to solenoid controlled pilot operated directional control valves for pneumatic power systems and more particularly to a valve of this type in which means is provided for shifting the valve at least once after the supply of air under pressure that is normally used for shifting the valve becomes inadequate for this purpose.

Valves of this type have inlet, exhaust and motor ports and a shiftable valve element for controlling communication between the ports whereby air under pressure may be directed to and exhausted from a fluid motor. The valve element has piston surfaces exposed to piston chambers and air under pressure is communicated from the inlet to the piston chambers selectively for moving the valve element to its various positions. In order to provide a charge of air under pressure sufficient to shift the valve member at least once in the event supply pressure has been cut off or becomes inadequate, it has heretofore been proposed to trap a predetermined volume of air under pressure for this purpose within a separate chamber or chambers within the valve housing. Such arrangements are shown for example in Lansky et al. Patents 3,038,500, and 3,171,435.

It is an object of the present invention to provide a valve of the type described in which a supply of trapped air under pressure is contained within the valve housing for shifting the valve as aforesaid without materially increasing the size and weight of the housing over one in which no such trapped air is provided. This is accomplished by utilizing one of the piston chambers for storing air under pressure for use in the other piston chamber for shifting the valve when supply pressure is inadequate.

Figure 1:
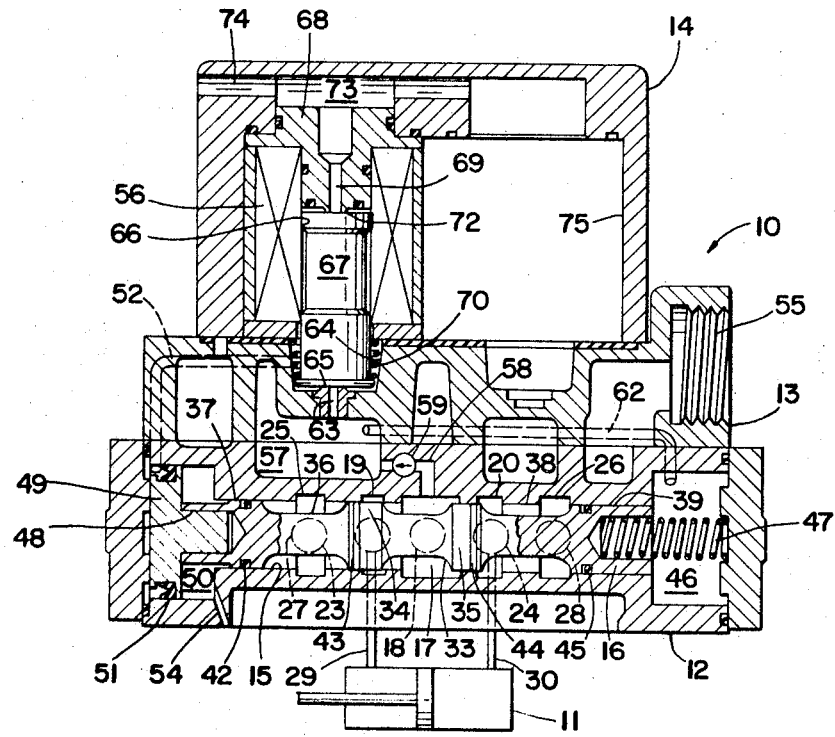
Figure 2:
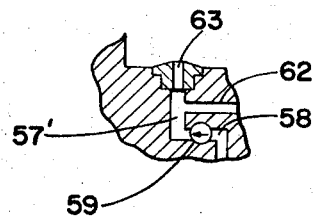

Other objects of the invention will be apparent from the following description and from the drawings in which, FIG. 1 is a cross-section and partially diagramatic illustration of a valve in accordance with the invention and FIG. 2 is a fragmentary view of a modified form of the valve.

The valve assembly is generally designated 10 and is used for controlling the supply and exhausting of air or other fluid under pressure from opposite ends of fluid motor 11.

The valve assembly includes a main housing section 12, a pilot valve housing section 13 and a solenoid housing section 14. The main housing section 12 has a cylindrical bore 15 in which a shiftable valve element or spool 16 is slidably mounted. Surrounding bore 15 is an annular inlet pressure chamber 17 connected to an inlet port 18, a pair of motor chamber 19, 20 respectively connected to a fluid motor 11, and a pair of exhaust chambers 25, 26 that communicate respectively to the exterior of housing section 12 by means of exhaust ports 27, 28. Motor ports 23, 24 are respectively connected to opposite ends of fluid motor 11 by conduits 29, 30.

Spool 16 has a groove 33 between a pair of lands 34, 35, a groove 36 between land 34 and another land 37 and a groove 38 between land 35 and another land 39. Each land preferably has mounted thereon one of the O-rings 42, 43, 44 and 45 for engaging in sealing contact with bore 15.

The rightward end of spool 16 is exposed to a piston chamber 46 and contacted by a compression spring 47. The left end of spool 16 has a bore 48 that receives an extension on a piston 49 that is slidably mounted within a piston chamber 50 and sealed relative to the outer wall of such chamber by a U-cup packing 51. Chamber 50, on the right side of piston 49 is vented to the exterior of the valve housing by a vent port 54.

Pilot valve housing section 13 is attached to main valve housing section 12 by means of bolts, not shown. Housing section 13 has an opening 55 through which electric wires, not shown, for energizing solenoid 56 may be brought. A volume chamber 57 is formed by connected cavities within housing sections 12 and 13 and is connected to inlet chamber 17 by a passage 58 containing a check valve 59 that permits flow of pressure fluid from inlet chamber 17 to volume chamber 57 but not vice versa. Volume chamber 57 is connected to piston chamber 46 by a passage 62 of substantial flow capacity so as not to provide the material restriction of flow of pressure fluid between volume chamber 57 and piston chamber 46.

Volume chamber 57 has a passage 63 leading therefrom to a chamber 64 and is surrounded at its upper end by a valve seat 65.

Solenoid housing section 14 has a solenoid coil 56 mounted therein and the latter has a central opening 66 that slidably receives an armature 67. And that also receives an adapter 68 having a passage 69 therethrough that is surrounded at its lower end by a valve seat 72. The upper end of passage 69 is open to a chamber 73 that is connected to the exterior of the housing by an exhaust passage 74. Housing section 14 also has a chamber 75 for receiving an additional solenoid and pilot valve in another form of the valve assembly and not herein described.

Operation

Spring 47 normally maintains valve spool 16 in the leftward position, as shown, in which groove 33 connects inlet chamber 17 with motor chamber 19 for directing air under pressure through conduit 29 to the left end of motor 11. At the same time, spool groove 38 connects motor chamber 28 to exhaust chamber 26 to permit exhausting of air from the right end of motor 11 via conduit 30 and exhaust port 28. Also, air under pressure from inlet chamber 17 has entered volume chamber 57 by way of passage 58 and check valve 59 and from volume chamber 57 has entered piston chamber 46 via passage 62. At this time solenoid 56 is de-energized and armature 67 is pressed downward by spring 70 into engagement with valve seat 65 to close passage 63. Also, the left chamber 70, past armature 67 and through passage 69, chamber 73 and passage 74. Fluid pressure within piston chamber 46 acts leftwardly on valve spool 16 on an area defined by packing 45 to assist spring 47 in holding the valve spool in the left hand position.

Upon energizing solenoid 56, armature 67 moves upwardly to close passage 69 and open passage 63. This permits pressure fluid to flow from inlet chamber 17 via passage 58, check valve 59, volume chamber 57, passage 63, chamber 70 and passage 52 to the left end of piston chamber 50 to act on the left side of piston 49 across an area defined by the outer diameter of packing 51. Because the latter area is substantially greater than the area of the right hand end of spool 16 where it is acted upon by air under pressure in piston chamber 46, piston 49 will move spool 16 to its rightward position. In the latter position, groove 33 connects inlet chamber 17 with motor chamber 20 to direct fluid to the right hand end of motor 11 through conduit 30. At the same time, groove 36 connects motor chamber 19 with exhaust chamber 25 so that fluid from the left end of motor 11 exhausts via conduit 29, chambers 19 and 25, passage 27, chamber 26 and exhaust port 28.

Upon de-energizing solenoid 56, armature 67 is returned to its lower position for closing off passage 63 by spring 70, thus connecting conduit 52 to exhaust port 74 as aforesaid for exhausting the left hand end of piston chamber 50 to permit spring 47 and pressure fluid in chamber 46 to move valve spool 16 to its leftward position.

In the event spool 16 is in its leftward position and there should be a failure of the source of supply of air under pressure to inlet chamber 17, or if such supply pressure becomes reduced to the extent that it is insufficient for moving piston 49 to the right upon energizing of solenoid 56, the spool may be moved to the right at least once by pressure fluid trapped within the valve assembly. Thus, in this situation and upon energization of solenoid 56 for raising armature 67 to close off passage 72 and open passage 63, air under pressure in volume chamber 57 and in piston chamber 46 will be directed through passage 63, chamber 70 and passage 52 to the lefthand end of piston chamber 50 to move piston 49 and spool 16 to the right. By utilizing air under pressure that is trapped in piston chamber 46, as well as that trapped in volume chamber 57, the size of volume chamber 57 may be correspondingly smaller than if only the air trapped in the latter is used for this purpose. Alternatively, chamber 57 may be replaced by a passage portion 57' as shown in FIG. 2, in which case piston chamber 46 is made large enough to contain a sufficient volume of air for shifting valve spool 16 to the right by acting on piston 49 as aforesaid. In either case housing sections 12 and 13 may be of smaller size and weight than if the air in piston chamber 46 is not used for shifting the valve spool to the right.

The valve as shown operates as a four way valve in that two motor ports 23, 24 are shown for connection to motor 11. The valve may also function as a three way valve by plugging either of the ports 23, 24 and omitting a connection between such plugged port and motor 11. In such case the piston in the fluid motor is moved in only one direction by fluid pressure and a spring is provided to move it in the opposite direction.

I claim:

1. In a valve assembly, a housing having fluid inet, exhaust, and motor chambers, a valve element movable to a first operating position in which it connects the motor chamber to the inlet chamber and movable to a second operating position in which it connects the motor chamber to the exhaust chamber, said valve element having a first piston portion exposed to a first piston chamber and a second piston portion a smaller area than the first piston portion exposed to a second piston chamber, passage means connecting the inlet chamber to both said piston chambers, check valve means closing communication between said passage means and said inlet chamber when the pressure of fluid in said inlet chamber is less than te pressure of fluid in said passage means, a vent port, pilot valve means operable to a first position in which is connects the first piston chamber to the vent port and closes communication between the first piston chamber and said passage means whereby fluid in the second piston chamber moves the valve element to one of its operating positions, said pilot valve also being operable to a second position in which it closes communication between the first piston chamber and the vent port and opens communication between the first piston chamber and the passage means whereby fluid under pressure in said first piston chamber moves the valve element to its other operating position, said second piston chamber being of a size to contain a sufficient amount of fluid under pressure whereby when the check valve means is closed and the pilot valve means is operated for connecting the passage means to the first piston chamber fluid will flow from said second piston chamber to the first piston chamber via said passage means for moving said valve element as aforesaid, and means to operate said pilot valve means.

2. The valve of claim 1 in which the housing has another motor chamber that is connected to the exhaust chamber in the first operating position of the valve element and is connected to the inlet chamber in the second operating position of the valve element.

3. The valve assembly of claim 1 in which a spring acts upon the valve element urging the same toward its first operating position.

4. In a valve assembly, a housing having fluid inlet, exhaust and motor chambers, a valve element movable to a first operating position in which it connects the motor chamber to the inlet chamber and movable to a second operating position in which it connects the motor chamber to the exhaust chamber, said valve element having a first piston portion exposed to a first piston chamber and a second piston portion of smaller area than the first piston portion exposed to a second piston chamber, passage means leading from the inlet chamber and having a check valve therein, said passage means having first and second branches downstream of the check valve, the first branch leading to the first piston chamber and the second branch leading to the second piston chamber, a vent passage, a pilot valve having a first operating position in which it closes communication between the first branch passage and the inlet chamber and opens the first branch passage to the vent passage whereby fluid from the first piston chamber exhausts through the vent passage and fluid in the inlet chamber passes through the check valve and the second branch passage to the second piston chamber and acts on the second piston portion to move the valve element to one of its operating positions, said pilot valve having a second operating position in which it opens the first branch passage to the inlet chamber and closes the same relative to the vent passage whereby fluid from the inlet chamber is directed to the first piston chamber and acts on the first piston portion to move the valve element to its second operating position, said check valve being effective to prevent back flow of fluid under pressure from said second piston chamber to said inlet chamber in the event of loss of pressure in the latter, and said second piston chamber being of a size to contain a sufficient amount of fluid under pressure whereby when the check valve is closed and the pilot valve is moved to its second operating position, fluid will flow from said second piston chamber to the first piston chamber for moving the valve element as aforesaid and means for moving the pilot valve between its first and second positions.

5. The valve assembly of claim 4 in which there is an additional chamber communicating with the passage means downstream of the check valve and communicating with both branch passages and containing an additional supply of fluid pressure for delivery to said first piston chamber in the event of loss of pressure in said inlet chamber.

References Cited

UNITED STATES PATENTS

| | | | |
|---|---|---|---|
| 3,038,500 | 6/1962 | Lansky et al. | 137—596.15 |
| 3,171,435 | 3/1965 | Lansky et al. | 137—596.16 |

M. CARY NELSON, *Primary Examiner.*

R. J. MILLER, *Assistant Examiner.*